United States Patent [19]
Yamamoto

[11] Patent Number: 5,892,571
[45] Date of Patent: Apr. 6, 1999

[54] CASSETTE TYPE ELECTRONIC IMAGE PRINTING APPARATUS AND PHOTOGRAPHIC PROCESSING SYSTEM USING THE APPARATUS

[75] Inventor: Yuji Yamamoto, Wakayama, Japan

[73] Assignee: Noritsu Koki Co., Ltd., Japan

[21] Appl. No.: 853,199

[22] Filed: May 9, 1997

[30] Foreign Application Priority Data

May 10, 1996 [JP] Japan ................................ 8-115851

[51] Int. Cl.⁶ ........................... G03B 27/52; G03D 13/06
[52] U.S. Cl. ........................................... 355/27; 396/594
[58] Field of Search ............................. 355/27–29, 77; 250/580; 378/189; 395/115; 396/594, 595, 620

[56] References Cited

U.S. PATENT DOCUMENTS

| | | | |
|---|---|---|---|
| 4,566,784 | 1/1986 | Nitsch | 355/72 |
| 4,698,647 | 10/1987 | Gerlach | 346/108 |
| 4,937,676 | 6/1990 | Finelli et al. | 358/229 |
| 5,436,688 | 7/1995 | Tanaka | 396/620 |
| 5,661,309 | 8/1997 | Jeromin et al. | 378/189 |

FOREIGN PATENT DOCUMENTS

0615154  9/1994  European Pat. Off. ........ G03B 27/72

Primary Examiner—D. Rutledge
Attorney, Agent, or Firm—Fulbright & Jaworski, LLP

[57] ABSTRACT

A cassette type electronic image printing apparatus 200 is attached to a photosensitive material entrance opening 101 of a photographic processing apparatus 100 for developing photosensitive material 2 exposed with a film image. After the photosensitive material, e.g. a print paper, is exposed with an electronic image by the electronic image printing apparatus, the print paper is introduced, through the photosensitive material entrance opening 101, into the photographic processing apparatus, in which the print paper is transported by a transport mechanism 5 to a developing unit 4 to be developed thereby. By exposing the print paper also with a film image by a film exposing unit 3 of the photographic processing apparatus, a composite image print of the electronic image and the film image may be obtained optionally.

8 Claims, 5 Drawing Sheets

CASSETTE TYPE ELECTRONIC IMAGE PRINTING APPARATUS AND PHOTOGRAPHIC PROCESSING SYSTEM USING THE APPARATUS

BACKGROUND OF THE INVENTION

1. Field of the Invention

The present invention relates generally to the art of exposing and developing an electronically recorded image on photosensitive material from electronic image data generated by decomposing an image into a number of dots.

2. Description of the Related Art

Recently, there has been proposed a photographic processing apparatus including a film image exposing unit for exposing a film image (i.e. an analog image) on photosensitive material and an electronic image exposing unit for exposing an electronically recorded image ('electronic image' hereinafter) of characters, CG or the like (i.e. a digital image) on photosensitive material by using e.g. a flat CRT or FOT (fiber optical tube), thus the apparatus being capable of providing either separate prints respectively of the film image and the digital image or a composite print of the film and digital images.

With such 'hybrid' or 'dual' type photographic processing apparatus capable of processing both a film image and an electronic image as described above, the components of the film image exposing unit and those of the electronic image exposing unit both need to be disposed in the course of a photosensitive material transport line extending from a photosensitive material supplying unit to a developing unit, so that the entire apparatus tends to be significantly large in size. Moreover, at present, the electronic image exposing unit is far less frequently used than the film image exposing unit. Still, the photosensitive material to be processed by the film image exposing unit alone needs to go all the way through the portion of the transport line extended for the electronic image exposing unit. This is inefficient.

While demand for the electronic image printing is expected to increase in future, it still will be a significant economic burden to replace the existing conventional film image processing apparatus by the dual type apparatus as described above.

In addition to the economic disadvantage as above, the co-existence of the film image exposing unit and the electronic image exposing unit within a common housing of the apparatus may lead also to a technical difficulty, as this necessitates effective protection of the former unit against heat and/or light discharged from the latter unit and vice versa.

SUMMARY OF THE INVENTION

In view of the above-described state of the art, a primary object of the present invention is to provide art of electronic image printing capable of solving the above-described drawbacks inherent in the dual type photographic processing apparatus which can process both a film image and an electronic image.

For accomplishing the above-noted object, according to the present invention, an electronic image printing apparatus, which prints an electronic image on photosensitive material from electronic image data generated by decomposing an image into a number of dots, is provided in the form of a cassette type apparatus detachably attachable to a photosensitive material entrance opening of a photographic processing apparatus for exposing and developing a film image. In operation, the cassette type electronic image printing apparatus is attached to the photosensitive material entrance opening of the photographic processing apparatus which per se cannot expose the electronic image. With this, the electronic image is exposed on the photosensitive material by this attached electronic image printing apparatus and then this material exposed with the electronic image is transported through the photosensitive material entrance opening into the photographic processing apparatus to be developed therein, whereby a print of the electronic image may be obtained.

This electronic image printing apparatus is simply attached to the photographic processing apparatus only when such necessity arises. Therefore, the printing apparatus occupies no space at all in the case of conventional film image processing. Further, as this electronic image printing apparatus simply utilizes the existing developing unit of the photographic processing apparatus, substantially no modifications will be needed in the conventional photographic processing apparatus. Especially, the attachment of this electronic image printing apparatus does not require any measures to be taken on the side of the photographic processing apparatus against heat and/or light discharged from the electronic image printing apparatus in the course of its electronic image exposing process.

According to one preferred embodiment of the present invention, the cassette type electronic image printing apparatus includes first fixing means, such as a clamp or engaging member which per se is known, for enabling the detachable attachment thereof to the photographic processing apparatus, and second fixing means, such as a clamp or engaging member which also per se is known, for enabling detachable attachment thereof to a photosensitive material magazine. According to this construction, as the cassette type electronic image printing apparatus is fixed to the photographic processing apparatus by means of e.g. a clamp member and fixed also to the photosensitive material magazine by means of e.g. another clamp member, there is temporarily realized an 'integrated' electronic image printing system. Then, when the necessity for the electronic image printing disappears, the photosensitive material magazine and the cassette type electronic image printing apparatus are detached from the photographic processing apparatus, whereby the compact photographic processing apparatus dedicated to the film image printing is realized again.

According to a further preferred embodiment of the present invention, the cassette type electronic image printing apparatus includes a first opening which comes into registry with the photosensitive material entrance opening of the photographic processing apparatus when the electronic image printing apparatus is attached to the photographic processing apparatus, a second opening which comes into registry with the a photosensitive material exit opening of the photosensitive material magazine when the electronic image printing apparatus is attached to the photosensitive material magazine, and a transporting unit for forming a photosensitive material transport line between the first opening and the second opening. With this construction, when the cassette type electronic image printing apparatus is attached with both the photographic processing apparatus and the photosensitive material magazine, there is formed one continuous photosensitive material transporting line from the photosensitive material magazine to the photosensitive material entrance opening of the photographic processing apparatus. Then, as being transported along this continuous transporting line, the photosensitive material drawn out of the photosensitive material magazine may be exposed by electronic image exposing means and then fed into the photographic processing apparatus to reach the developing unit of this apparatus. In this construction, more preferably, the photosensitive material transporting line of the cassette type electronic image printing apparatus includes a drive roller for automatically feeding the photosensitive material drawn out of the photosensitive material magazine to a photosensitive material transporting mechanism of the photographic processing apparatus. With this, there is formed an automated photosensitive material transport line for electronic image printing, extending from the photosensitive material magazine to the developing unit.

According to a further aspect of the present invention, there is proposed a photographic processing system comprising a photographic processing apparatus including a film image exposing unit for exposing a film image on photosensitive material, a developing unit for developing the exposed photosensitive material and a transport mechanism for transporting the photosensitive material and the above-described cassette type electronic image printing apparatus, wherein the cassette type electronic image printing apparatus is detachably attachable to a photosensitive material entrance opening of the photographic processing apparatus and the electronic image printing apparatus is capable of feeding the photosensitive material to the photosensitive material transport mechanism of the photographic processing apparatus. In the case of this photographic processing system, it is further proposed that the cassette type electronic image printing apparatus be detachably attachable to a photosensitive material magazine entrance opening or a control-strip entrance opening of the photographic processing apparatus for introducing the photosensitive material or control strips therein.

The above 'control strip' refers to a strip-like material provided by a manufacturer for the purpose of controlling development process routinely. For this purpose, the control strip has been subjected, by the manufacturer, in advance to a certain number of steps of exposure. Specifically, at each processing laboratory, this control strip is developed by the installed processing apparatus and then density values of the developed strip are compared with those of a reference strip which was exposed and developed by a standard process by the manufacturer. Then, based on the results of this comparison, the development process is routinely controlled. As may be apparent from such purpose, the entrance opening for introducing this control strip is normally provided in a ceiling wall of the processing apparatus adjacent an entrance area to the developing unit, so as to allow the control strip to be directly inserted to the developing unit.

According to a still further aspect of the present invention, there is proposed a photographic processing apparatus to be used in combination with the cassette type electronic image printing apparatus described above, the photographic processing apparatus introducing, through a photosensitive material entrance opening thereof, the photosensitive material which has been exposed with an electronic image and then developing this photosensitive material. Preferably, for enabling smooth introduction of the photosensitive material exposed with the electronic image for its development, the photographic processing apparatus includes an I/O interface with a control line and/or power line from the cassette type electronic image printing apparatus.

Further and other objects, features and effects of the invention will become more apparent from the following more detailed description of the embodiments of the invention with reference to the accompanying drawings.

DESCRIPTION OF THE PREFERRED EMBODIMENTS

Figure 1:
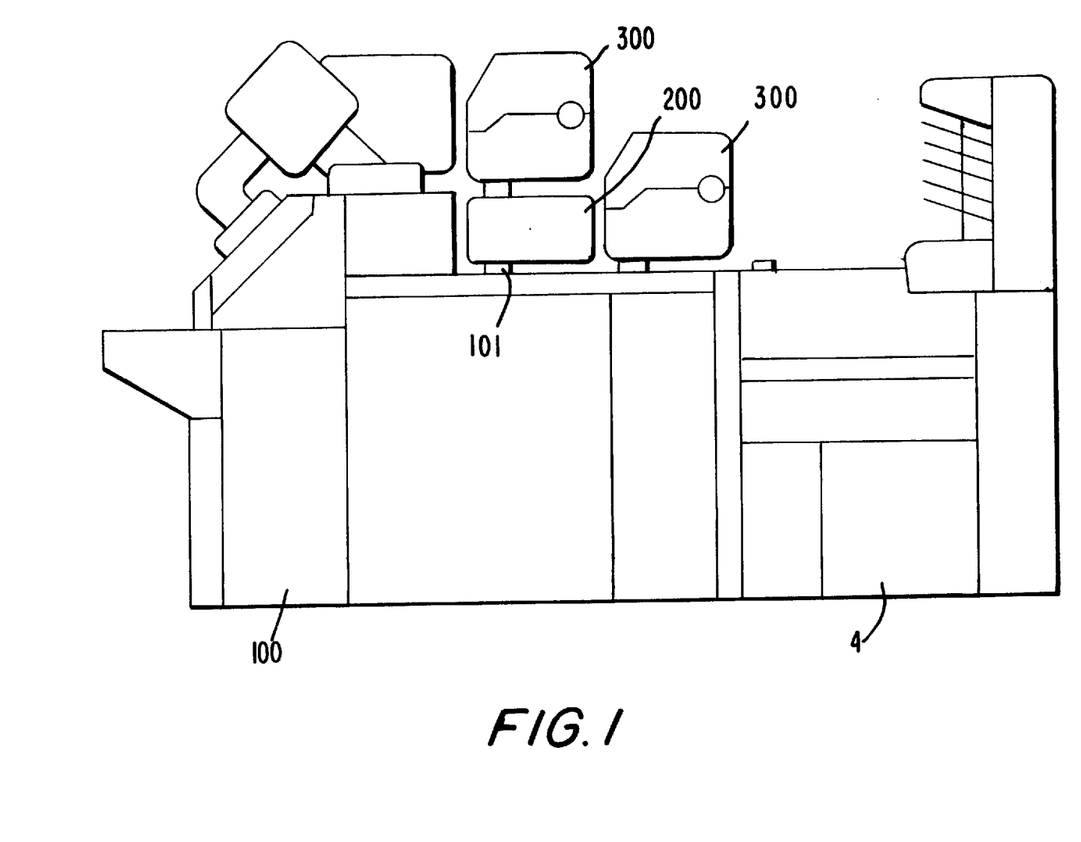
FIG. 1 is an outer appearance view of a photographic processing system according to one preferred embodiment of the present invention.
Figure 2:
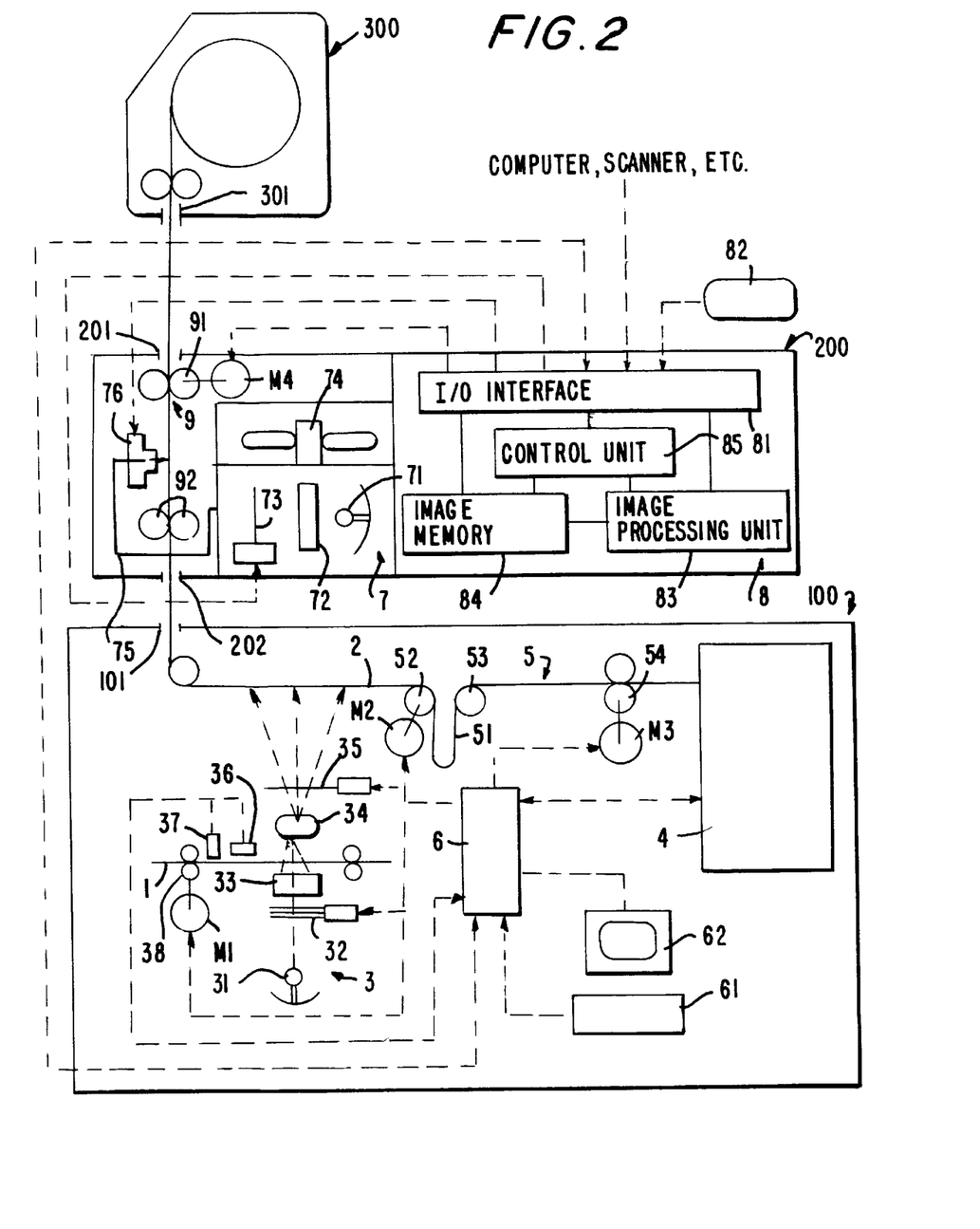
FIG. 2 is a construction diagram of the photographic processing system shown in FIG. 1.

FIG. 1 shows an outer appearance of a photographic processing system relating to one preferred embodiment of the present invention. In this system, an electronic image printing apparatus 200 is attached to a print-paper entrance opening 101 of a photographic processing apparatus 100, and also a print-paper magazine 300 is attached to an upper face of the electronic image printing apparatus 200. FIG. 2 is a construction diagram showing principal components of this photographic processing system.

As shown in FIG. 2, the photographic processing apparatus 100 includes a film image exposing unit 3 for exposing a print paper 2 (an example of photosensitive material) with an image of a photographic film 1 (to be referred to simply as 'film' hereinafter) through a known projection-exposure process, a developing unit 4 for developing the exposed print paper 2, a print-paper transporting mechanism 5 for transporting the print paper 2, and a controller 6 for controlling operations of the respective components of this photographic processing apparatus 100. The print-paper transporting mechanism 5 includes a loop-forming unit 51 for forming a loop of the print paper 2 in order to allow the transportation of the print paper 2 at the film image exposing unit 3 and that at the developing unit 4 to be effected independently of each other. The controller 6 is connected with a control panel 61 for allowing inputs of various instructions and a monitor 62 for displaying image information.

The electronic image printing apparatus 200 includes an electronic image exposing unit 7, a print-paper transporting unit 9 for transporting the print paper 2 from the print-paper magazine 300 through the print-paper entrance opening 101 of the photographic processing apparatus 100 to the print-paper transporting mechanism 5 thereof, and a control unit 8 for controlling operations of the various components of this electronic image printing apparatus 200. Further, this electronic image printing apparatus 200 includes a second opening 201 at an upper face thereof for allowing introduction of the print paper 2 into the apparatus and also a first opening 202 at a lower face thereof for allowing exit of the print paper 2 out of the apparatus. The control unit 8 includes an I/O (input/output) interface 81 for transmitting various control instructions to respective components of the electronic image exposing unit 7, receiving image data from a computer or scanner or the like and also for exchanging data with the controller 6 of the photographic processing apparatus 100. Further, this control unit 8 is connected with a control panel 82 for allowing inputs of various instructions.

Figure 3:
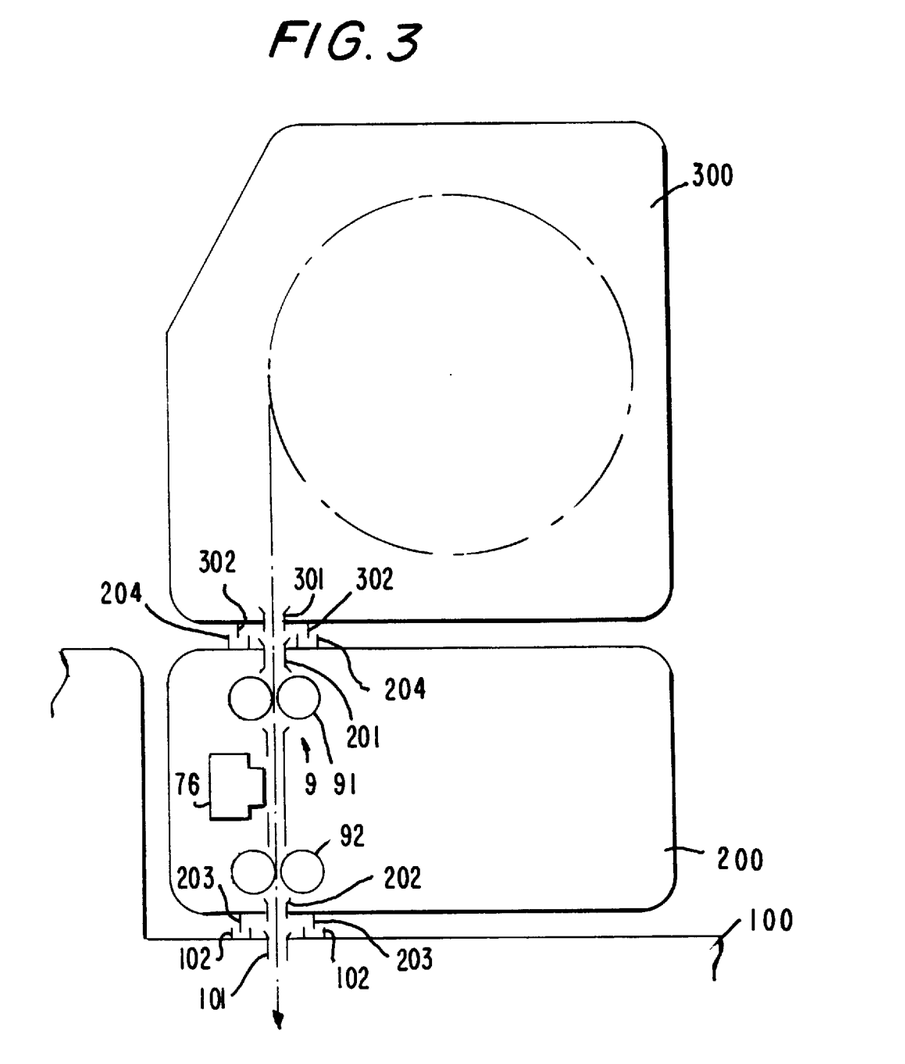
FIG. 3 is a diagram illustrating connections among a photographic processing apparatus, an electronic image printing apparatus and a print paper magazine all of which are included in the photographic processing system of the invention.

As shown in FIG. 3, the photographic processing apparatus 100 includes a socket 102 adjacent the periphery of the print-paper entrance opening 101, while the electronic image printing apparatus 200 includes a corresponding plug 203 adjacent the periphery of the first opening 202. Then, as the plug 203 is connected into the socket 102, the electronic image printing apparatus 200 is attached to the photographic processing apparatus 100 in a light-shielded manner. In this connection, the print-paper entrance opening 101 of the photographic processing apparatus 100 comes into opposed registry with the first opening 202 of the electronic image printing apparatus 200, thereby to connect the transporting line formed within the electronic image printing apparatus 200 by its print-paper transporting unit 9 with the transporting line formed within the photographic processing apparatus 100 by its print-paper transporting mechanism 5. That is to say, the socket 102 and the plug 203 together function as first fixing means for detachably attaching the electronic image printing apparatus 200 to the photographic processing apparatus 100.

Further, the electronic image printing apparatus 200 also includes another socket 204 adjacent the periphery of its second opening 201 and the print-paper magazine 300 includes a corresponding plug 302 adjacent the periphery of a print-paper exit opening 301 thereof. Then, as this plug 302 is connected into the socket 204, the print-paper magazine 300 is attached to the electronic image printing apparatus 200 in a light-shielded manner. In this connection, the second opening 201 of the electronic image printing apparatus 200 comes into registry with the exit opening 301 of the print-paper magazine 300, thereby to connect the print-paper withdrawing line within the print-paper magazine 300 with the transporting line formed within the electronic image printing apparatus 200 by the print-paper transporting unit 9 thereof. That is to say, the socket 204 and the plug 302 together function as second fixing means for detachably attaching the print-paper magazine 300 to the electronic image printing apparatus 200.

When the electronic image printing apparatus 200 is not necessary, this apparatus 200 is detached, then the plug 302 of the print-paper magazine 300 may be connected directly into the socket 101 provided at the print-paper entrance opening 101 of the photographic processing apparatus 100. In the above description, the plugs and sockets are provided as the fixing means. Instead, various types of clamp mechanisms may be employed as the fixing means.

For effecting a printing operation of a film image, the print paper 2 drawn through the exit opening 301 of the print-paper magazine 300 in which the print paper 2 is stored in a rolled state is caused to just pass the electronic image printing apparatus 200 and then charged into the photographic processing apparatus 100, where the print paper is exposed with the film image by the film image exposing unit 3, developed by the developing unit 4, cut into pieces each bearing one-frame amount of image information and then discharged from the apparatus.

On the other hand, for effecting a printing operation of an electronic image, the print paper 2 drawn out of the print-paper magazine 300 is exposed with the electronic image by the electronic image exposing unit 7 of the electronic image printing apparatus 200 and then charged into the photographic processing apparatus 100, where the exposed print paper is caused to just pass the film image exposing unit 3, developed by the developing unit 4, cut into pieces each bearing one frame amount of image information and then discharged from the apparatus.

Needless to say, with the system described above, it is also possible to obtain a composite image print of an electronic image and a film image by exposing the print paper 2 by both the electronic image exposing unit 7 and the film exposing unit 3.

Next, the respective components of the above system will be described more particularly.

The film image exposing unit 3 includes, along a common optical axis, a light modulating filter 32 for adjusting balance of color components of light irradiated on a film 1, a mirror tunnel 33 for uniformly mixing the color components of the light past the light modulating filter 32, a printing lens 34 for focusing the image information of the film 1 on the print paper 2 and a shutter 35.

On the upstream of the film image exposing unit 3 in the film transporting passage, there is disposed an image sensor 36 for reading the image information of the film 1 as divided into a number of areas. This image sensor 36 is operable to irradiate white light on the film 1, separate its reflection or transmission light into the three primary color components of red, green and blue for enabling a CCD line sensor or a CCD image sensor to measure intensities of the respective components. The image information read by the image sensor 36 is transmitted also to the controller 6, which utilizes the information for determining exposure conditions used in the film image exposing unit 3 and produces a simulated image to be displayed on the monitor 62 which image would result on the print paper 2 if the paper were exposed with the image information under the determined exposure conditions.

On the upstream of the image sensor 36 in the film transporting passage, there is provided a magnetic head 37 as reading means for reading information magnetically recorded in a magnetic recording area of the film 1. This information recorded in the magnetic recording area of the film 1 includes various photography conditions such as the type of camera used, type of lens used, frame number, film speed, date of photography, designation of pseude-zooming/panoramic photography, backlight/under or over-exposure, use/non-use of flash, color temperature of the flash, aperture value, orientation of the camera at the time of photography and also such user-inputted data such as comments reading: 'snowy mountain', 'setting sun', 'human subject' or the like.

Of the above-described recorded information, the data relating to the various photography conditions are utilized for determining exposure conditions to be used by the film image exposing unit 3 when exposing a film frame corresponding to the read magnetic recording area. On the other hand, the data inputted by the user may be transmitted to the electronic image printing apparatus to be exposed on the print paper 2 by the electronic image exposing unit 7.

On the upstream side of the magnetic head 37 in the film transporting passage, there is provided a motor M1 for rotatably driving rollers 38 for feeding the film 1 to the film image exposing unit 3.

At the film image exposing unit 3, the exposure conditions are determined, based on the image information of the film 1 read by the image sensor 36 in association with the feeding operation of the film 1 by the rollers 38 as well as on the photography-condition relating data read by the magnetic head 37. Then, based on the determined exposure conditions, amounts of insertion of respective color filter elements of the light modulating filter 32 and the opening period of the shutter 35 are controlled, while the image information of the film 1 is being printed on the print paper 2.

The loop-forming unit 51 incorporated in the transporting mechanism 5 forming the transporting line of the print paper 2 within the photographic processing apparatus 100 includes rollers 53, 53 for transporting the print paper 2, a motor M2 for rotatably driving the roller 52 and also an unillustrated flap which is switched over between a condition for guiding the paper 2 straight between the rollers 52, 53 and a further condition for allowing formation of a loop of the print paper 2 as shown in FIG. 2. With this formation of loop, the transporting speed of the print paper 2 at the film image exposing unit 3 may be set independently of that at the developing unit 4. For the same purpose, if necessary, another loop-forming unit may be incorporated in the print-paper transporting line between the film image exposing unit 3 and the electronic image exposing unit 7 of the electronic image printing apparatus 200. The transporting mechanism 5 also includes a further roller 54 immediately before the developing unit 4 for feeding the print paper 2 into this developing unit 4 and a motor M3 for rotatably driving this roller 54.

The electronic image exposing unit 7 of the electronic image printing apparatus 200 includes an exposing light source 71, a color filter 72, a shutter 73, a cooling fan 74, a PLZT printing head 76 and an optical fiber bundle 75 for transmitting light from the exposing light source 71 to the PLZT printing head 76. Though not shown in details, the PLZT printing head 76 includes a number of PLZT elements respectively disposed between a polarizer and an analyzer, which elements are arranged linearly in a direction normal to the transporting direction of the print paper 2. In operation, by varying the potential to be applied between a pair of electrodes provided in each PLZT element, the polarizing direction of the light passing between the electrodes is varied, so that each PLZT functions as a light shutter for selectively allowing or inhibiting the passage of light therethrough.

The print-paper transporting unit 9 of the electronic image printing apparatus 200 includes a drive roller 91, a guide roller 92, and a motor M4 for rotatably driving the drive roller 9 under control by the control unit 8.

The control unit 8 of the electronic image printing apparatus 200 includes an image processing section 83 for receiving through the I/O interface 82 electronic image signals from e.g. a computer, a scanner or the like, an image memory 84 for storing image data to be processed by the image processing unit 83 and then exposed on the print paper 2, and a control section 85 for retrieving one line amount of image data from the image memory 84 and transmitting these data to the PLZT printing head 76 in synchronism with an instruction to the motor M4 of the transporting unit 9 for feeding one line amount of print paper. Incidentally, the capacity of the image memory 84 may be limited to one-line amount. In this case too, the input operation of one line amount of image data from the scanner or computer and the transmitting operation of one line amount of image data from the image processing section 83 via the memory 84 to the PLZT printing head 76 will be effected in synchronism with the one line amount of feeding operation of the print paper 2. Further, this control unit 8 of the electronic image printing apparatus 200 may be connected via a data communication line with the controller 6 of the photographic processing unit 100 for enabling data communication therebetween. In this case, the image data processed by the image processing section 83 may be transmitted to the controller 6 to be displayed on the monitor 62. Or, by transmitting data designating an exposure area for the electronic image to the controller 6, the controller 6 may control the film image exposing unit 3 to produce the film image in juxtaposition with the electronic image or produce a composite image of these images.

For obtaining a print of the electronic image (i.e. digital image) by using the cassette type electronic image printing apparatus 200 described above, first, the electronic image printing apparatus 200 is attached to the photographic processing apparatus 100 and further the print-paper magazine 300 is attached to the electronic image printing apparatus 200. Then, when the print paper 2 drawn from the print-paper magazine 300 is transported by the transporting unit 9 to the electronic image exposing unit 7, the electronic image transmitted from the scanner or computer is exposed for one line after another by the PLZT printing head 76. Upon completion of exposure of the entire electronic image thereon, the print paper 2 is transported out of the electronic image printing apparatus 200 into the photographic processing apparatus 100. Then, in this apparatus 100, the print paper 2 is transported by the transporting mechanism 5 to the film image exposing unit 3, through which the paper 2 is exposed with a film image with use of an appropriate paper mask, and this exposed print paper 2 is then transported to the developing unit 4 to be developed therein. Thereafter, the developed print paper 2 is cut into one-frame pieces and discharged on to a tray. Details of the developing unit 4 will be given in the description of other embodiments to follow.

[other embodiments]

Figure 4:
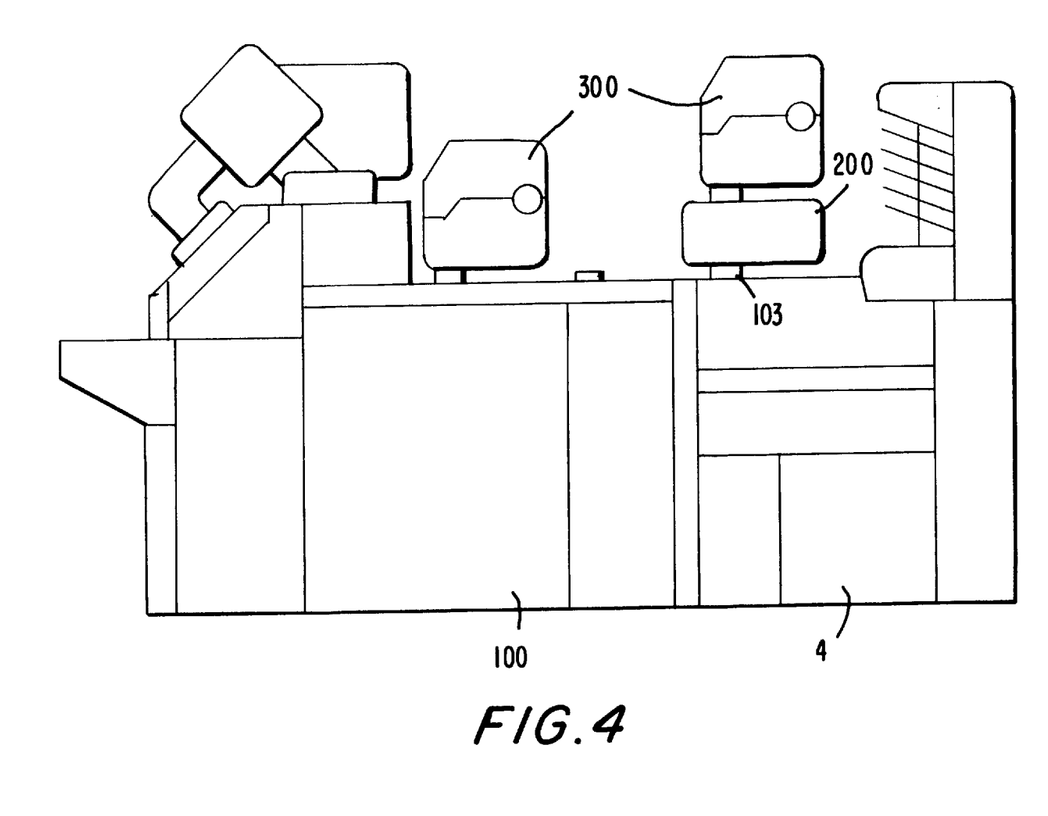
FIG. 4 is an outer appearance view of a photographic processing system according to a further embodiment of the present invention.
Figure 5:
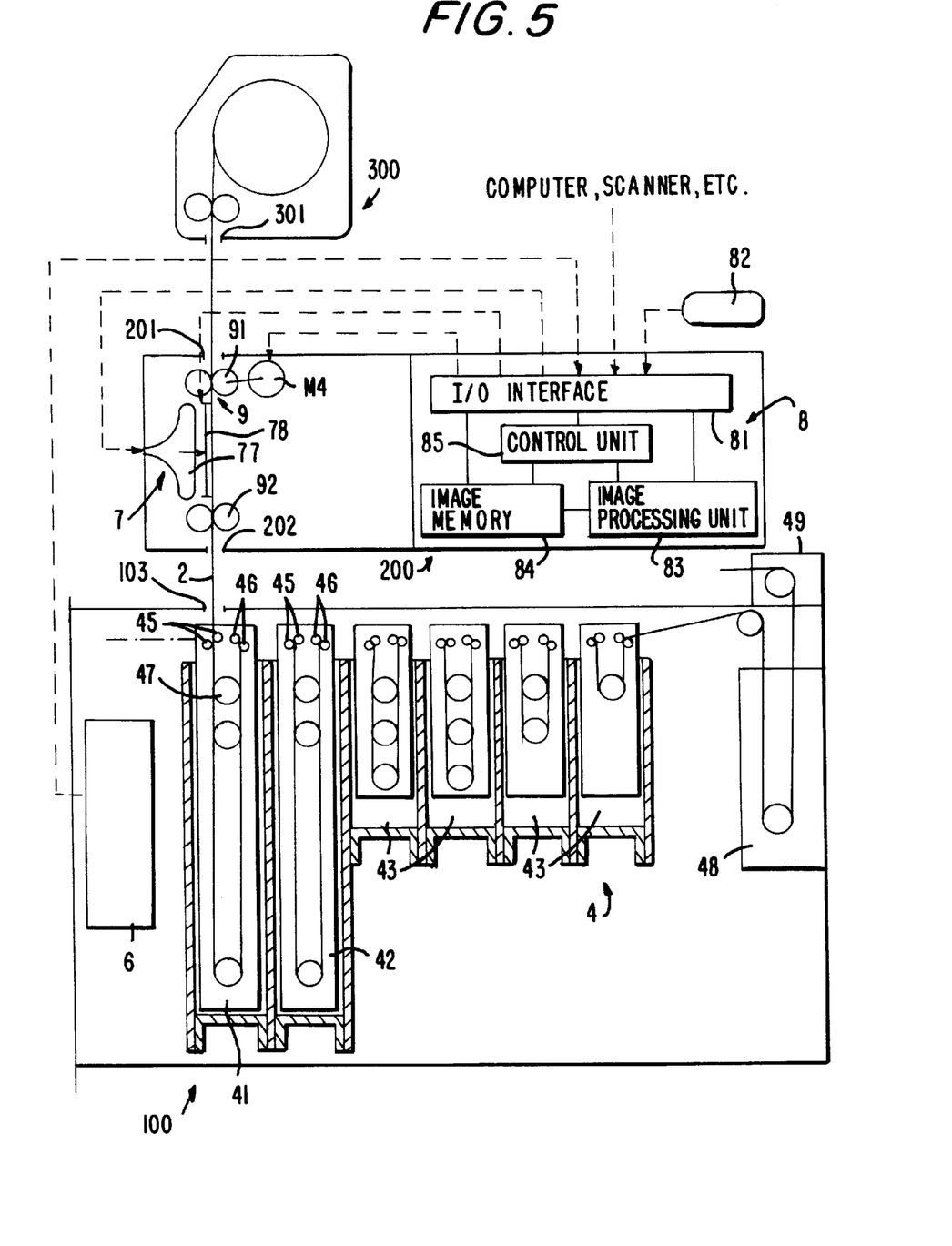
FIG. 5 is a construction diagram of the photographic processing system shown in FIG. 4.

In the case of a further photographic processing system shown in FIG. 4, the electronic image printing apparatus 200 is attached to a control-strip entrance opening 103 provided upwardly of the developing unit 4 of the photographic processing apparatus 100, and the print-paper magazine 300 is attached to the upper face of the electronic image printing apparatus 200. FIG. 5 shows the entire system assembled as above, including the electronic image printing apparatus 200 attached to the control-strip entrance opening 103 and the print-paper magazine 300 attached to the printing apparatus 200. As may be apparent from this figure, a socket 102 similar to the one described in the foregoing embodiment is provided adjacent the periphery of the control-strip entrance opening 103. Then, as the plug 203 of the electronic image printing apparatus 200 is connected into this socket 102, the electronic image printing apparatus 200 may be fixedly attached to the photographic processing apparatus 100, with the first opening 202 of the former being in registry with the control-strip entrance opening 103 of the latter.

As shown in FIG. 5, the construction of the electronic image printing apparatus 200 differs from that of the foregoing embodiment in also that this apparatus employs a CRT printing head 77 in place of the PLZT printing head 76 as the major component of the electronic image exposing unit 7. In this case, from the image memory 84 storing one frame amount of image data transmitted from the image processing section 83, R, B, B components of the data are serially retrieved in association with selective operations of R, B, B filter 78, and the CRT printing head 77 is driven. Upon completion of exposure of one frame amount of image data, the motor M4 of the transporting unit 9 is driven to feed the print paper 2 for a length corresponding to the next one frame amount. Needless to say, this CRT printing head 77 may be employed also in the foregoing embodiment, or conversely, the PLZT printing head 76 of the foregoing embodiment may be employed in this further embodiment as well. Or, any other type of printing head may be employed in the present invention.

The print-paper magazine 300 employed in this embodiment is identical to that employed and described in the foregoing embodiment. The print paper 2 drawn from the print-paper magazine 300 and then exposed by the CRT printing head 77 is transported through the first opening 202 and then the control-strip entrance opening 103 into the developing unit 4 of the photographic processing apparatus 100 consequently.

The developing unit 4 includes total six developing tanks charged with plural kinds of developing liquids for effecting series of developing process consisting of color-development, bleaching, fixing and stabilizing steps. Specifically, the six tanks include, from the upstream side of the transporting direction of the print paper 2 (i.e. from the left side in FIG. 5), one color developing tank 41, one bleaching-fixing tank 42, and four stabilizing tanks 43. Above the liquid level in each of the tanks 41 through 43, there are provided a carry-in roller 45 for carrying in the print paper 2 and a carry-out roller 46 for carrying the print paper 2 out of each tank. Further, within each of the tanks 41 through 44, there are provided a plurality of transporting rollers 47 for guiding and transporting the print paper 2 within the tank.

Then, the print paper 2 which has been exposed by the electronic image exposing unit 7 and charged into the developing unit 4 is now guided by the transporting roller 45 of the color developing tank 41 into this tank 41. Then, the print paper 2 is carried in and out of the respective tanks in succession. Through this process, the print paper 2 is developed. The developed print paper 2 is transported to a drying chamber 48 to be dried therein, cut into pieces of an appropriate size, and then discharged through a discharging section 49 out of the photographic processing apparatus 100.

That is, in the case of this embodiment, the print paper 2 exposed by the electronic image exposing unit 7 is directly charged into the developing unit 4 of the photographic processing apparatus 100 without passing the film image exposing unit 3 of this apparatus 100, whereby the transporting passage of the print paper may be advantageously shortened.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A cassette type electronic image printing apparatus attachable to a photographic processing apparatus which photographic processing apparatus is operable to expose a photosensitive material with a film image and develop the exposed photosensitive material at a developing unit, the cassette type electronic image printing apparatus comprising:

electronic image exposing means for exposing the photosensitive material with an electronic image by using electronic image data generated by decomposing an image into a number of dots and then transporting the exposed photosensitive material to the developing unit of the photographic processing apparatus; and an attaching mechanism for attaching the cassette type electronic image printing apparatus to a photosensitive material opening of the photographic processing apparatus.

2. An electronic image printing apparatus according to claim 1, wherein the attaching mechanism includes first fixing means for enabling detachable attachment of the printing apparatus to the photographic processing apparatus and second fixing means for enabling detachable attachment of the printing apparatus to a photosensitive material magazine storing the photosensitive material therein.

3. An electronic image printing apparatus according to claim 2, further comprising:

a first opening which comes into registry with the photosensitive material entrance opening when the printing apparatus is attached to the photographic processing apparatus;

a second opening which comes into registry with a photosensitive material exit opening of the photosensitive material magazine when the printing apparatus is attached to the magazine; and a transporting unit for forming a photosensitive material transport line between the first opening and the second opening, the electronic image exposing means being disposed on the photosensitive material transport line.

4. A cassette type electronic image printing apparatus according to claim 3, wherein on the photosensitive material transport line, there is disposed a drive roller for feeding the photosensitive material drawn out of the photosensitive material magazine to a photosensitive material transporting mechanism of the photographic processing apparatus.

5. A photographic processing system comprising:

a photographic processing apparatus including;

a film image exposing unit for exposing photosensitive material with a film image;

a developing unit for developing the exposed photosensitive material;

a transport mechanism for transporting the photosensitive material; and a cassette type electronic image printing apparatus for exposing the photosensitive material with an electronic image by using electronic image data generated by decomposing an image into a number of dots, the cassette type electronic image printing apparatus including;

an attaching mechanism for attaching the printing apparatus to a photosensitive material entrance opening of the photographic processing apparatus, and a transporting unit for transporting the exposed photosensitive material to the transport mechanism.

6. A photographic processing system according to claim 5, wherein the cassette type electronic image printing apparatus is attached to a photosensitive material entrance opening of the photographic processing apparatus.

7. A photographic processing apparatus comprising:

a photosensitive material entrance opening for introducing photosensitive material;

a film image exposing unit for exposing the photosensitive material with a film image;

a developing unit for developing the exposed photosensitive material;

a transport mechanism for transporting the photosensitive material from the photosensitive material entrance opening via the film image exposing unit to the developing unit;

wherein the transport mechanism transports, from the photosensitive material entrance opening to the developing unit, photosensitive material which has been exposed by an electronic image printing apparatus for exposing the photosensitive material with an electronic image by using electronic image data generated by decomposing an image into a number of dots.

8. A photographic processing apparatus according to claim 7, wherein at the photosensitive material entrance opening, there is provided fixing means for detachably attaching the electronic image printing apparatus to the photographic processing apparatus.

* * * * *